United States Patent
Reisner-Kollmann et al.

(10) Patent No.: US 9,607,437 B2
(45) Date of Patent: Mar. 28, 2017

(54) GENERATING AUGMENTED REALITY CONTENT FOR UNKNOWN OBJECTS

(71) Applicant: QUALCOMM Incorporated, San Diego, CA (US)

(72) Inventors: Irene Reisner-Kollmann, Vienna (AT); Istvan Siklossy, Vienna (AT); Johannes Scharl, Vienna (AT); Roy Lawrence Ashok Inigo, San Diego, CA (US); Umberto Laurent Cannarsa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/317,018

(22) Filed: Jun. 27, 2014

(65) Prior Publication Data
US 2015/0097862 A1 Apr. 9, 2015

Related U.S. Application Data

(60) Provisional application No. 61/887,218, filed on Oct. 4, 2013.

(51) Int. Cl.
G06T 19/00 (2011.01)
G06T 19/20 (2011.01)
(52) U.S. Cl.
CPC .......... *G06T 19/006* (2013.01); *G06T 19/20* (2013.01); *G06T 2219/2012* (2013.01)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS 8,606,317 B2   12/2013   Ahmad Athsani et al.
8,606,645 B1   12/2013   Applefeld
(Continued)

OTHER PUBLICATIONS

Tonnis M., "Data Management for Augmented Reality Applications," Jul. 15, 2003, 170 pages
(Continued)

*Primary Examiner* — Todd Buttram
(74) *Attorney, Agent, or Firm* — Kilpatrick Townsend & Stockton

(57) ABSTRACT

Techniques described herein provide a method for defining virtual content for real objects that are unknown or unidentified at the time of the development of the application for an augmented reality (AR) environment. For example, at the time of development of an AR application, the application developer may not know the context that the mobile device may operate in and consequently the types or classes of real object and the number of real objects that the AR application may encounter. In one embodiment, the mobile device may detect unknown objects from a physical scene. The mobile device may then associate an object template with the unknown object based on the physical attributes, such as height, shape, size, etc., associated with the unknown object. The mobile device may render a display object at the pose of the unknown object using at least one display property of the object template.

30 Claims, 14 Drawing Sheets

(58) Field of Classification Search
CPC ........ G06F 3/011; G06F 3/012; G06F 3/0304; G06T 19/00; G06T 19/006; G06T 17/00; H04N 5/272; A63F 13/10
See application file for complete search history.

(56) References Cited

U.S. PATENT DOCUMENTS

| | | | |
|---|---|---|---|
| 2006/0026628 A1 | 2/2006 | Wan et al. | |
| 2009/0046140 A1* | 2/2009 | Lashmet | G09G 3/002 348/51 |
| 2009/0066690 A1* | 3/2009 | Harrison | G06T 19/006 345/419 |
| 2009/0279784 A1* | 11/2009 | Arcas | G06T 17/00 382/190 |
| 2013/0050258 A1 | 2/2013 | Liu et al. | |
| 2013/0141530 A1 | 6/2013 | Zavesky | |
| 2013/0328927 A1 | 12/2013 | Mount et al. | |
| 2013/0342570 A1* | 12/2013 | Kinnebrew | G09G 3/003 345/633 |
| 2014/0300597 A1* | 10/2014 | Holcomb | G06K 9/00369 345/420 |
| 2014/0321702 A1* | 10/2014 | Schmalstieg | G06K 9/00624 382/103 |
| 2014/0344762 A1* | 11/2014 | Grasset | G06F 3/04815 715/852 |
| 2014/0368532 A1* | 12/2014 | Keane | G02B 27/017 345/619 |
| 2015/0062166 A1* | 3/2015 | Pan | G06T 7/0081 345/633 |

OTHER PUBLICATIONS

International Search Report and Written Opinion—PCT/US2014/059090—ISA/EPO—Jul. 31, 2015.
Ventura, J., et al., "Real-time Planar World Modeling for Augmented Reality", Oct. 13, 2010 (Oct. 13, 2010), pp. 1-4, Retrieved from the Internet: URL:http://www.cs.ucsb.edurholl/pubs/Ventura-2010-ARSuperModels.pdf.

* cited by examiner

GENERATING AUGMENTED REALITY CONTENT FOR UNKNOWN OBJECTS

CROSS-REFERENCES TO RELATED APPLICATIONS

This application is a non-provisional application and claims the benefit of priority of U.S. Provisional Application No. 61/887,218 titled "METHOD AND APPARATUS TO DEFINE AUGMENTED REALITY CONTENT FOR UNKNOWN OBJECTS," and filed on Oct. 4, 2013, which is herein incorporated by reference in its entirety for all purposes.

TECHNICAL FIELD

The present disclosures generally relate to augmented reality environments, and more specifically, machine-based recognition of real-world surroundings.

BACKGROUND

In augmented reality (AR) environments, a user may view an integration of artificial or virtual graphics with the user's natural surroundings. In some early implementations of AR, a user may see graphics displayed arbitrarily amongst or within the user's natural surroundings via, for example, augmented reality goggles. For instance, a graphic of a random butterfly may fly along the view of the AR goggles while the user continues to view his or her natural surroundings, regardless of whether the butterfly has any relevance to anything the user is seeing naturally. In more sophisticated implementations of AR, a user may be able to apply AR features or graphics directly to objects or structures of the user's natural surroundings. For example, an object sitting on a table may be identified and rendered with a different color or different physical attributes in the AR environment. However, augmenting the reality of an object during runtime requires that the object in the environment is identified and re-rendered with the desired characteristics.

Limiting AR to known and identified objects reduces the applicability of AR applications. Techniques, described herein, solve this and other problems.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

SUMMARY

Figure 1:
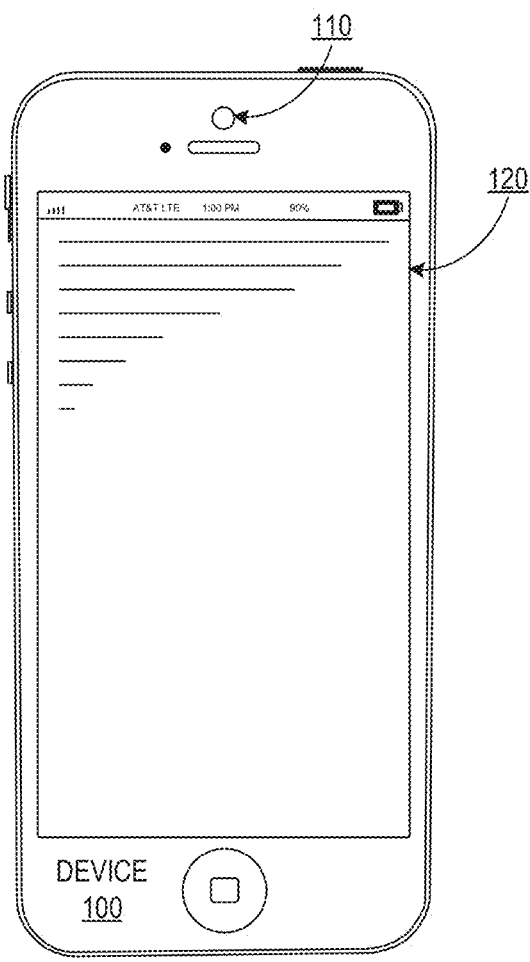
FIG. 1 illustrates an example computing device that may be configured to implement one or more aspects of the disclosure.

Techniques described herein provide a method for defining virtual content for real objects that are unknown or unidentified at the time of the development of the application for an augmented reality (AR) environment. For example, at the time of development of an AR application, the application developer may not know the context that the mobile device and the AR application may operate in and consequently the types or classes of real objects and the number of real objects that the AR application may encounter. Other techniques describe methods for displaying virtual content instead of real objects during runtime of an AR application.

Techniques for constructing a digital representation of a physical scene with virtual content for unknown objects for an augmented reality environment are described. In one aspect, at runtime, the mobile device or components of the mobile device obtains information about the physical scene. For example, the mobile device may detect that the scene has a planer surface. The mobile device may detect and select one or more unknown objects and determine poses and other attributes associated with the unknown object. The mobile device may then associate an object template with the unknown object based on the attributes, such as height, shape, size, etc., associated with the unknown object. In one aspect of the disclosure, the object template may be generated by a developer using a three dimensional (3D) authoring tool in an editing mode. The mobile device may render a display object at the pose of the unknown object using at least one property of the object template. For example, the mobile device may render a brick red building instead of the unknown object if the color property of the object model is brick red and the structure property is a building.

An example method for constructing a digital representation of a physical scene, may include selecting an unknown object from the physical scene, determining at least one physical attribute associated with the unknown object, selecting an object template representing an object different from the unknown object based on the at least one physical attribute associated with the unknown object, and rendering a display object in the digital representation of the physical scene at a position of the unknown object from the physical scene using at least one display property associated with the object template. In certain aspects, rendering the display object may comprise rendering the display object on an image representing the physical scene to be displayed on a display screen of a mobile device.

In certain aspects of the method, the at least one physical attribute associated with the unknown object may include one or more of shape of the unknown object, size of the unknown object, location of the unknown object, pose of the unknown object, order of appearance of the unknown object with respect to other objects, mode of an application associated with the rendering of the display object, and attributes of other unknown objects. In certain aspects of the method, the at least one display property associated with the object template comprises one or more of graphical and animation properties. Graphical properties may include one or more of color, size, texture, shape, collision detection, occlusion, and transparency.

In certain implementations of the method, the properties of the object template are selected by a developer using an editing interface at a time of development of an application. In one implementation, the unknown object is one of a plurality of unknown objects and the object template is associated with multiple unknown objects from the plurality of unknown objects. In certain aspects of the disclosure, the object template may be one of a plurality of object templates.

An example mobile device for constructing a digital representation of a physical scene may include a camera for acquiring physical scene information, a memory for storing information and processor for selecting an unknown object from the physical scene, determining at least one physical attribute associated with the unknown object, selecting an object template representing an object different from the unknown object based on the at least one physical attribute associated with the unknown object, and rendering a display object in the digital representation of the physical scene at a position of the unknown object from the physical scene using at least one display property associated with the object template. In certain implementations, rendering the display object may comprise rendering the display object on an image representing the physical scene to be displayed on a display screen of a mobile device.

In certain implementations of the mobile device, the at least one physical attribute associated with the unknown object may include one or more of shape of the unknown object, size of the unknown object, location of the unknown object, pose of the unknown object, order of appearance of the unknown object with respect to other objects, mode of an application associated with the rendering of the display object, and attributes of other unknown objects. In certain implementations of the mobile device, the at least one display property associated with the object template comprises one or more of graphical and animation properties. Graphical properties may include one or more of color, size, texture, shape, collision detection, occlusion, and transparency.

In certain implementations of the mobile device, the properties of the object template are selected by a developer using an editing interface at a time of development of an application. In one implementation, the unknown object is one of a plurality of unknown objects and the object template may be associated with multiple unknown objects from the plurality of unknown objects. In certain aspects of the disclosure, the object template may be one of a plurality of object templates.

An example non-transitory computer-readable storage medium, wherein the non-transitory computer-readable storage medium comprises instructions executable by a processor, the instructions may include instructions to select an unknown object from a physical scene, determine at least one physical attribute associated with the unknown object, select an object template representing an object different from the unknown object based on the at least one physical attribute associated with the unknown object, and render a display object in a digital representation of the physical scene at a position of the unknown object from the physical scene using at least one display property associated with the object template. In certain implementations, rendering the display object may comprise rendering the display object on an image representing the physical scene to be displayed on a display screen of a mobile device.

In certain aspects of the example non-transitory computer-readable medium, the at least one physical attribute associated with the unknown object may include one or more of shape of the unknown object, size of the unknown object, location of the unknown object, pose of the unknown object, order of appearance of the unknown object with respect to other objects, mode of an application associated with the rendering of the display object, and attributes of other unknown objects. In certain implementations of the non-transitory computer-readable medium, the at least one display property associated with the object template comprises one or more of graphical and animation properties. Graphical properties may include one or more of color, size, texture, shape, collision detection, occlusion, and transparency.

In certain implementations of the non-transitory computer-readable medium, the properties of the object template are selected by a developer using an editing interface at a time of development of an application. In one implementation, the unknown object is one of a plurality of unknown objects and the object template may be associated with multiple unknown objects from the plurality of unknown objects. In certain aspects, the object template may be one of a plurality of object templates.

An example apparatus may include means for selecting an unknown object from a physical scene, means for determining at least one physical attribute associated with the unknown object, means for selecting an object template representing an object different from the unknown object based on the at least one physical attribute associated with the unknown object, and means for rendering a display object in a digital representation of the physical scene at a position of the unknown object from the physical scene using at least one display property associated with the object template. In certain aspects, rendering the display object may comprise rendering the display object on an image representing the physical scene to be displayed on a display screen of a mobile device.

In certain implementations of the apparatus, the at least one physical attribute associated with the unknown object may include one or more of shape of the unknown object, size of the unknown object, location of the unknown object, pose of the unknown object, order of appearance of the unknown object with respect to other objects, mode of an application associated with the rendering of the display object, and attributes of other unknown objects. In certain aspects of the apparatus, the at least one display property associated with the object template comprises one or more of graphical and animation properties. Graphical properties may include one or more of color, size, texture, shape, collision detection, occlusion, and transparency.

In certain implementations of the apparatus, the properties of the object template are selected by a developer using an editing interface at a time of development of an application. In one implementation, the unknown object is one of a plurality of unknown objects and the object template may be associated with multiple unknown objects from the plurality of unknown objects. In certain aspects, the object template may be one of a plurality of object templates.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Mobile augmented reality involves the detection and tracking of real objects, and rendering virtual content relative to these real objects. It may be desirable to know an object's pose and shape to create a convincing interaction between real and virtual content. If the real object can be identified as an object known at the time of development of the application, the application developer can create a sophisticated augmented reality experience using the known geometry of the known real object and a three dimensional (3D) authoring tool. For example, the developer can create virtual content for the known real object such as graphics, animation, collision detection, etc. If the object is known, all interactions with a real object can be simulated with a virtual representation of this object in the 3D authoring tool. For example, if the application developer knows that the physical scene may be a kitchen top table, the developer may define the virtual content properties for a tea cup. At runtime when the application identifies a tea cup, the application may use the defined virtual content by the developer for a tea cup.

An application developer or developer may refer to a user of an editing tool, such as a 3D authoring tool, for creating an application in an editor mode. An editor mode may refer to a mode of the editing tool during which the application is developed by the application developer. An editing tool may include, but is not limited to, a user interface for developing an application. In one implementation, the developer may use a user interface provided by the editing tool in editor mode for developing the application. The user interface may be a graphical or command interface.

At runtime, that may be at a later point in time, the application developed in the editor mode may be executed by the same or a different user on the same or a different device. Runtime may refer to an execution of instructions or object code associated with the application, at a later point in time after the development of the application in the editor mode. At runtime, the application can interact with the real time environment of the device.

Techniques described herein provide a method for defining virtual content properties for real objects that are unknown or unidentified (hereafter, unknown objects) at the time of the development of the application. For example, at the time of development of the AR application, the application developer may not know the context that the mobile device and the AR application executing on the mobile device may be operating in and consequently the types or classes of real object and the number of real objects that the AR application may encounter. Even if the context is known, the AR application may still encounter unknown objects. Without knowing physical attributes of the object, such as shape, size, relative poses and relative positioning of the real objects, it may be difficult for the developer to generate virtual content for the unknown objects that may be encountered at runtime. Furthermore, when the mobile device and the camera coupled to the mobile device moves across the physical scene, the dimensions of the objects, such as the shapes, sizes or poses, as viewed from the perspective of the mobile device, may change over time.

In some embodiments, a reasonable abstraction of the scene may be used for representing a physical scene. For example, in the editor mode, the developer may work with a planar surface with objects on top. At runtime, the mobile device may determine that the physical scene may be represented as a planar surface and use the virtual content developed by the developer in rendering a digital representation of the scene on the display screen of the mobile device. While the planar surface with objects on top is only an example abstraction of a scene, planar surfaces are very common for indoor AR applications, e.g. tables and floors. Although embodiments of the invention and figures may be described using a planar surface, other representations of a physical scene may also be used without departing from the scope of the invention.

In one embodiment, a 3D authoring tool provides object templates to the developer, which represents a model for an unknown object. The developer may define display properties, such as graphics and animation, for the object template. Graphic properties for an object template may include, but are not limited to, one or more of color, size, texture, shape, collision detection, occlusion, and/or transparency. Furthermore, different object templates may also be defined and added to the representation of the scene in editor mode.

In editor mode, the tool may also provide an interface for defining one or more qualifiers for associating an object template with an unknown object at runtime. For example, in editor mode, the developer may define properties for an object template to look like a building structure that is brick red in color. Furthermore, the developer may define a qualifier that may dictate if the object template may be applied to an unknown object detected at runtime. For example, the qualifier may be defined in the editor mode, such that the object template for the brick red building may be used for an unknown object if the unknown object is a specific size and shape. In one implementation, at runtime, the object template may also be defined such that, if the qualifier is satisfied for the object template, the rendered image may display the object template (scaled to the size of the unknown object, in some instances) instead of the real unknown object.

As discussed above, an additional property of the object template may be the collider. Generally, collision detection may be enabled by defining a collider for each object represented in the scene. At runtime, the collider property may automatically adapt to the unknown object, based on definition of the object template associated with the unknown object. For example, the collider properties for an object template that define a rigid building would be different from those that define a waterfall. In one implementation, the collisions may be computed, using the mesh (i.e., geometric definition) of the unknown object. In another implementation, the collisions may be computed using a bounding box defined for the shape of the object.

At runtime, unknown objects can be associated with one of the object templates developed at the time of development using the editor tool. As discussed above, the mobile device may associate the unknown object with the object template based on the physical attributes identified for the unknown object. In one implementation, the object templates may have qualifiers associated with them that are matched against the identified physical attributes of the unknown object. The physical attributes of the unknown object may include, but are not limited to, one or more of shape of the unknown object, size of the unknown object, location of the unknown object, pose of the unknown object, order of appearance of the unknown object with respect to other objects, mode of an application associated with the rendering of the display object, and physical attributes of other unknown objects. If the qualifier is satisfied and an object template is associated with an unknown object, the object template, including its virtual content, may be enabled, positioned and rendered in the augmented reality view at the three dimensional (3D) pose of the unknown object from the physical scene.

In one implementation, in the editor mode, the object template may be visualized as a 3D box or any other shape for that matter, since the shape of the real object may not be known at the time of development. In another implementation, once the display object properties of the object template are defined, the object template may mold into the predefined shape. For example, if the display object properties are selected for a brick red house, the object template may morph to a shape and color that are representative of a brick red house. In one implementation, at runtime, the 3D box may be replaced by the geometry of the real (but unknown) object. The rendering settings for the unknown object may be defined and previewed in the editor on the 3D box. A possible display object property may be that the object is not rendered at all, because it might only be used for collisions.

In one embodiment, each object template may be defined using a local coordinate system, in which all virtual content for a specific object may be defined. At runtime, the local coordinate system may be moved or converted to the coordinate system for the 3D pose of the unknown object. In some implementations, it may be possible to scale the virtual content based on the size of the unknown object, or to use the original scale.

In certain embodiments, the display objects using the object template are automatically updated as the number and shape of the real objects change as perceived by the camera coupled to the mobile device. For example, as the user of the mobile device moves the mobile device, the shape and size of the display objects may change, based on the change in pose of the mobile device. In addition, in some implementations, the application may receive events based on certain triggers, such as detection of a new object or modification of an existing object. This may allow the developer to customize interactions during development, based on the prediction of runtime factors. For example, in an AR game, a new object may represent an obstacle, and the user may be alerted with a sound bite every time a new obstacle is detected.

Embodiments of the invention allow the developer to create augmented reality content in the editor mode for unknown objects. At runtime, the AR application executing on the mobile device may associate the unknown objects with an object template, based on the physical attributes of the unknown object. Embodiments of the invention allow including real-world, but unknown objects in an augmented reality application, even if the application can only detect a few physical attributes of the unknown objects at runtime.

A non-limiting example scenario for an AR application executing on a mobile device using embodiments of the invention, may include transformation of a digital representation of a physical scene such as a conference table with a number of objects of varying shapes and sizes sitting on the table. The physical scene may be acquired by a front facing camera of a mobile device and modified and rendered, using a processor according to embodiments of the invention on the display screen of the mobile device. In one embodiment, the AR application running on the mobile device enables the mobile device to transform the physical scene as digitally represented on the mobile device. An example of the AR application may be a game with a car racing across the digital representation of the physical scene displayed on the screen of the mobile device.

According to some embodiments of the invention, in the above example, the unknown objects from the real world may be transformed as buildings in the augmented reality shown on the mobile device screen. Using techniques described herein, the unknown objects from the physical scene may be replaced with renderings of buildings with different physical attributes. Therefore, in one example, a table with a number of objects sitting on top of the table may be represented as a city scene in AR displayed by the mobile device with a car (virtual object) driving on a path/road that passes through a number of buildings. As the user moves the mobile device, the view presented on the mobile device screen is adapted to changes in the pose of the various objects in the physical scene with respect to the camera coupled to the mobile device.

In one implementation, several predefined object templates may be available. Each object template may have a number of properties, such as size, shape, color, occlusion, etc. associated with it. At runtime, the object template may be associated with the unknown objects sitting on the table based on the physical attributes of the unknown objects. For example, mobile device may detect qualifier physical attributes, such as shape, size, pose, color, placement, etc. associated with the unknown objects from the physical scene and select an object template suitable for replacing/rendering the unknown object based on the physical attributes of the objects. For instance, based on the physical attributes of the unknown object, the mobile device may select object templates associated with different structure properties such as buildings, trees, or even creatures with animation capabilities to replace the unknown objects in the rendered digital representation of the physical scene on the mobile device.

Although, in describing the embodiments, terms such as "unknown objects" and "physical attributes of unknown objects" are used, in some instances, a "reconstructed object" may be used instead without departing from the invention. In one embodiment, a reconstructed object may refer to an unknown object with an associated set of physical attributes. For example, once the mobile device determines one or more physical attributes for the unknown objects and associates those physical attributes with the unknown object, the unknown object may be referred to as a reconstructed object. In one aspect, as the mobile device moves, the shape and size of the reconstructed object might change with the change in the 3D pose.

Referring to FIG. 1, example computing device 100 may be configured to implement one or more aspects of the disclosure. For example, computing device 100 may be a smart phone, tablet computer, personal digital assistant, or other mobile device that is equipped with one or more sensors that allow computing device 100 to receive image data or other data as a form of input. In another example, the computing device 100 may be a head-mounted device or any other computing device. In some embodiments, computing device 100 is not a mobile device, and may be, for example, a desktop computer, a gaming machine, a stationary sensor or camera, or a system of machines coupled together wirelessly or wired. Computing device 100 may be equipped with, be communicatively coupled to, and/or otherwise include one or more front-facing 110 or back facing cameras, mono-lens cameras, depth cameras, laser sensors, sonar sensors, and/or other sensors. The mobile device may also include one or more user interfaces for interacting with the device. For example, the mobile device may include a touchscreen 120 that the user may interact with to input data. Computing device 100 may also include one or more processors, memory units, and/or other hardware components, as described in greater detail below. Computing device 100 of FIG. 1 may be implemented, using one or more components described in more detail in FIG. 11

In one or more arrangements, computing device 100 may use any and/or all of these sensors alone or in combination to obtain data about the natural surroundings of computing device 100, either based on images or other means for defining physical boundaries. For example, computing device 100 may use one or more cameras to obtain one or more graphical views of the natural surroundings of computing device 100. In a specific example, the natural surroundings may include a table or other flat surface, and multiple objects lying on top of the table.

Figure 2A:
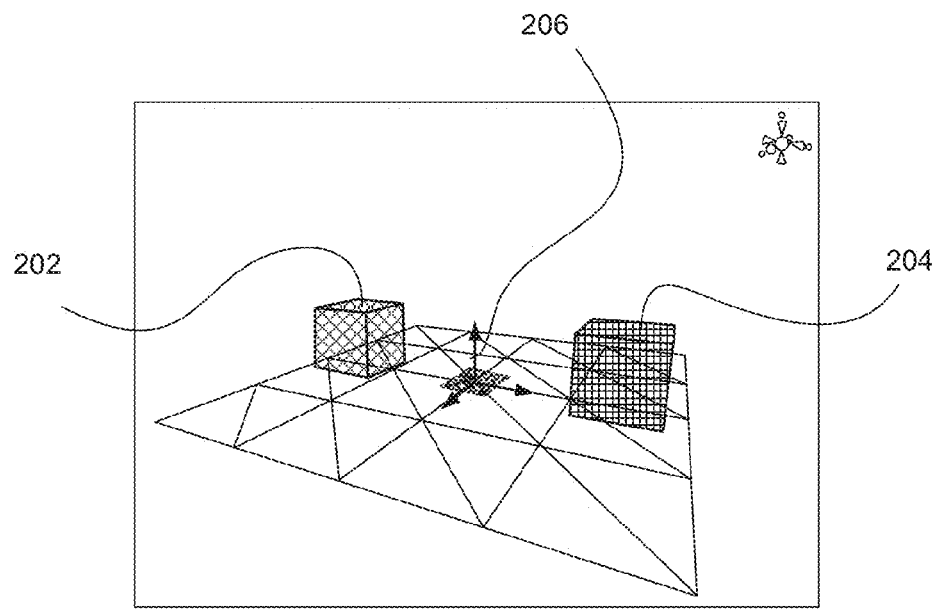
FIG. 2A illustrates an example visual representation of an interface for generating one or more object templates in an editor mode, according to one or more embodiments described in the disclosure.

FIG. 2A illustrates an example visual representation of an interface for generating one or more object templates in an editor mode, according to one or more embodiments of the invention. The object templates generated in the editor mode are used at a later time to replace/augment the display of unknown objects with display objects. The 3D authoring tool may run on a computing device similar to the device described in FIG. 11. FIG. 2A represents an abstraction of a planer surface in the editing mode of a 3D authoring tool. In the editing mode, the developer may add, define and edit object templates. For example, in FIG. 2A, two object templates with different colors, a red box 202 (red color shown as shade 1) and a blue box 204 (blue color shown as shade 2), are created in the 3D authoring tool and are positioned on either side of the image target 206. In one embodiment, such placement of the red and the blue boxes in the 3D authoring tool may associate a display property (i.e., color) with the object template, based on the relative position of the box with respect to the image target 206. For example, during runtime, the unknown objects on the left side (from the perspective of the user) of the target image 206 may be colored as red, and the unknown objects on the right side of the target image 206 may be colored as blue.

Figure 2B:
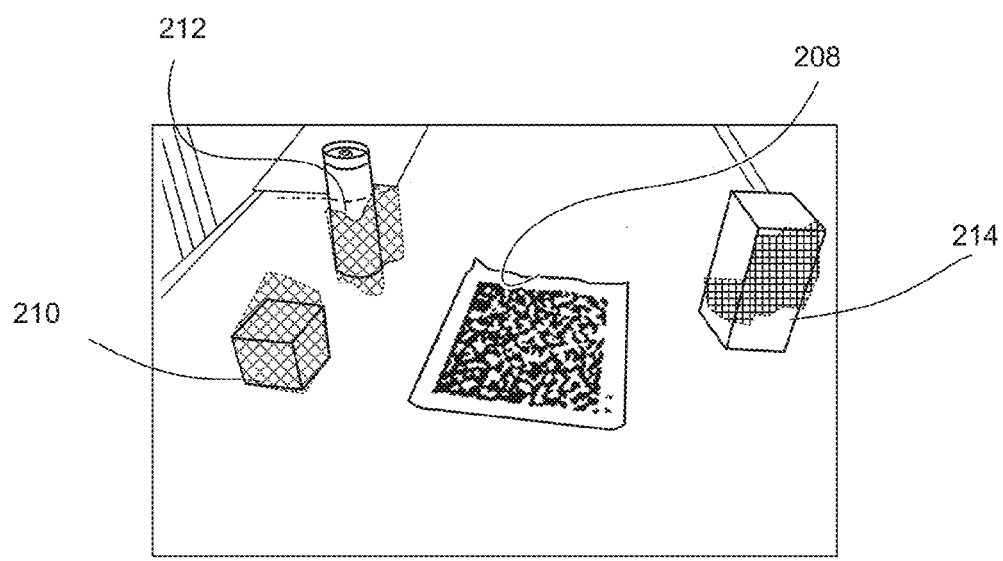
FIG. 2B illustrates an example of a display object as rendered at runtime, according to one or more embodiments described in the disclosure.

FIG. 2B illustrates an example of a display object as rendered at runtime, according to one or more embodiments of the invention. In one embodiment, in FIG. 2B, the computing device 100 may be distinct from the computing device, used for generating the object templates and the AR application. Furthermore, the computing device 100 may be configured to use the one or more object templates generated by the authoring tool, as described in FIG. 2A. For example, objects to the left of the target image, with respect to the perspective of the user, may be configured to display a red color and objects, with respect to the perspective of the user, to the right of the target image may be configured to display a blue color. At runtime, the computing device 100 may discover and select unknown objects and associate these unknown objects with one of the two object templates, that is either the red box 202 or the blue box 204 defined in the editing mode (as shown in FIG. 2A) according to their position on the ground plane relative to the image target. For example, all objects to the right side (e.g., 214) of the image target (object 214) are associated with the blue box 204 object template, and all objects to the left of the image target (i.e., objects 210 and objects 212) are associated with the red box 202 object template. In some instances, as shown in FIG. 2B for 210 and 212, some display properties, such as height and width, for the display object may be scaled based on the size of the unknown object.

In the simplistic example shown in FIG. 2B, the unknown objects are detected and their attributes are assessed before associating those objects with the object templates. In FIG. 2B, the relative placement of the unknown object with respect to the image target is used as the qualifier for associating the object template with the unknown object. Once the object template is selected, the object template is modified according to the attributes of the unknown object. For example, object 210 is relatively smaller than object 212, and therefore the object template is also scaled according to the height of the object. The modified instances of the object template may then be rendered on the mobile device display along with the digital representation of the physical scene.

Figure 3A:
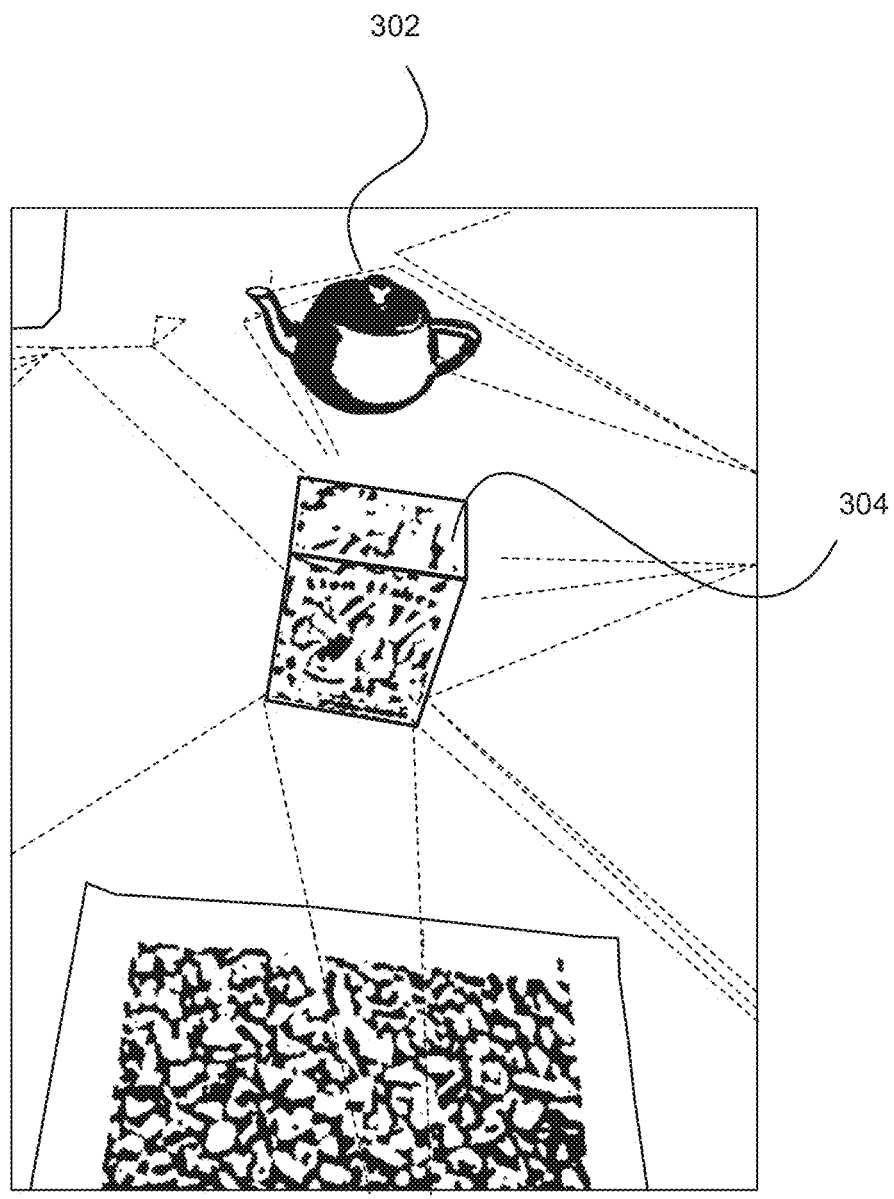
FIG. 3A illustrates an example digital representation of the physical scene at a first time, according to one embodiment of the disclosure.

FIG. 3A illustrates an example digital representation of the physical scene at a first time, according to one embodiment of the invention. FIG. 3A illustrates a scene with a virtual object, that is the tea pot 302 and an unknown object 304. In FIG. 3A, an object template is associated with the unknown object. In one implementation, the object template may be defined to allow rendering of the unknown object itself rather than overlaying the unknown object with visually apparent virtual content. Furthermore, the object template may be further defined to have object display properties for occlusion and collision. For example, the object template may be defined to be rendered with depth mask, which may mean that virtual objects behind it may be occluded at runtime.

Figure 3B:
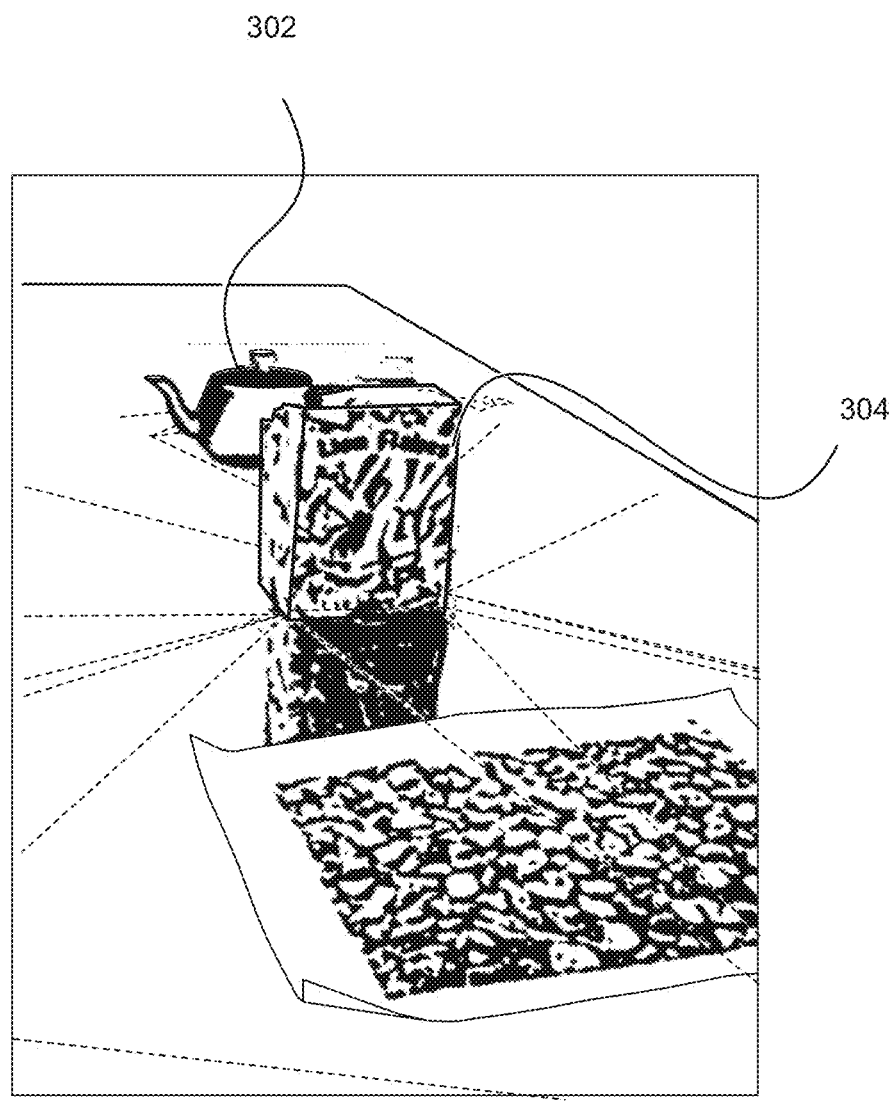
FIG. 3B illustrates an example digital representation of the physical scene from FIG. 3A at a second time, according to one embodiment described in the disclosure.

FIG. 3B illustrates an example digital representation of the physical scene from FIG. 3A at a second time, according to one embodiment of the invention. As shown in FIG. 3B, part of the tea cup 302 is occluded behind the unknown object 304, since the unknown object 304 is associated with an object template that has non-transparent occlusion properties. Similarly, the object template may be defined to have collision properties, such that, if the tea pot 302 bumps against the unknown object 304, the tea pot 302 will be prevented from making progress in the direction it was moving. In another embodiment, based on the properties of the tea pot 302 and the speed of the impact, the tea pot may break and shatter.

Figure 4:
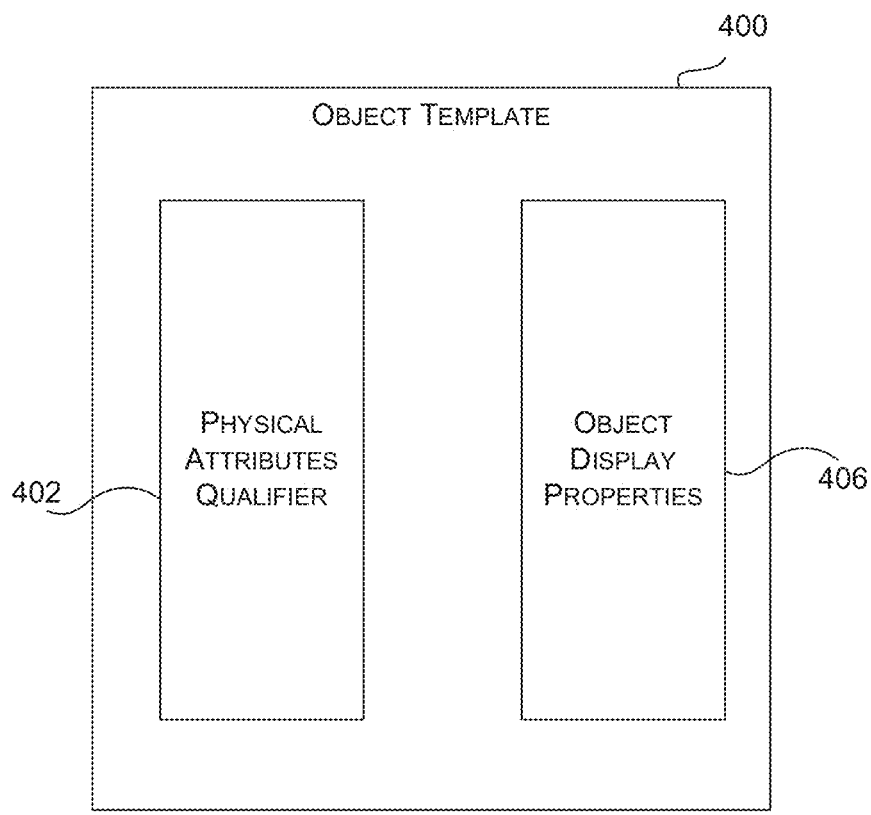
FIG. 4 is an example representation of an object template according to embodiments described in the disclosure.

FIG. 4 is an example representation of an object template according to embodiments of the invention. In FIG. 4, the object template 400 is shown to have the physical attributes of qualifier module 402 and the object display properties module 406. Modules described in FIG. 4 may be implemented using software, firmware, hardware or any other combination thereof. The object template 400 may have additional modules without departing from the scope of the invention.

The object template 400 may be stored as a data-structure in one implementation. In one implementation, a developer at development time may use an editor-tool to create the object template 400. The developer may create several object templates using the editor-tool to fit several different classes of unknown object at run-time. The developer may manually select the physical attributes for the physical attributes qualifier 402 (as shown in FIG. 5) and the display properties for the object display properties 406 (as shown in FIG. 6).

The physical attributes qualifier 402 holds the physical attributes used as a filter at run-time by the mobile device in selecting the object display properties 406 to augment rendering of the unknown object. If the physical attributes of the unknown object match or qualify under the physical attributes characteristics of the physical attributes qualifier 402, the object display properties 406 may be used in rendering of the unknown object or a virtual object instead of the unknown object. For example, if the height and width of the unknown object is within a specific range, the mobile device may render a building instead of the unknown object. In another example, the mobile device may render the unknown object itself, but use other display properties, such as the collider properties of the object.

Figure 8A:
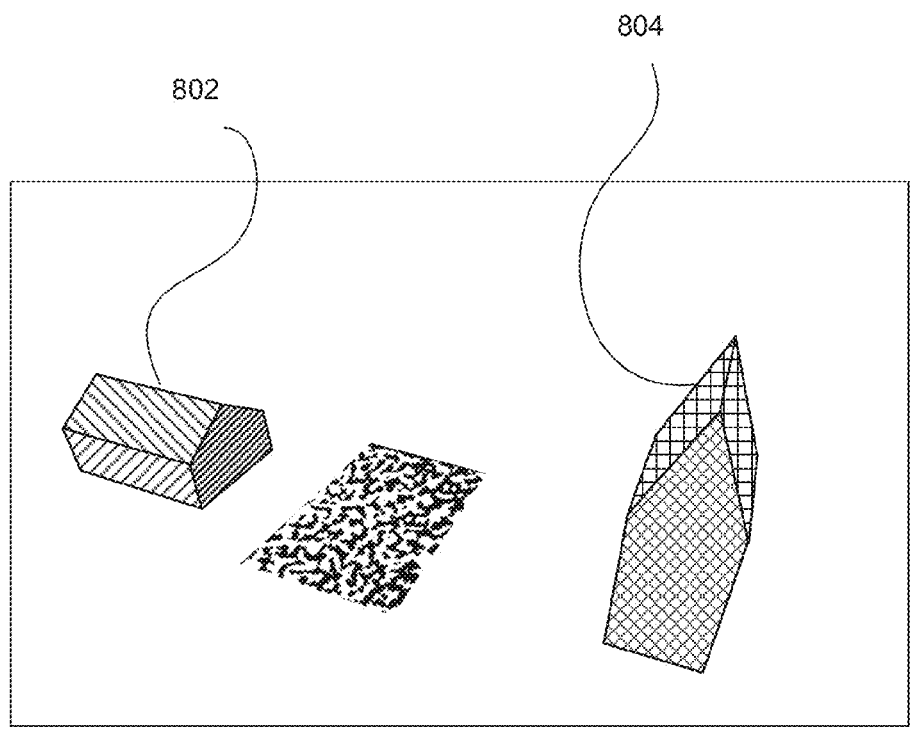
FIG. 8A illustrates two object templates as visually represented in the editor mode, according to one or more embodiments described in the disclosure.

In the development environment, in an editing tool, the object module may be visually represented, as shown in FIG. 2A and FIG. 8A. Even though FIG. 4 and FIG. 5 show menu style methods for creating and updating object modules, in some implementations, a visual drag, drop and editing tool may be facilitated for manipulating the object template. In certain embodiments, several techniques for developing the object module may be supported. For example, the developer may first generate a crude object module using example menus from FIG. 5 and FIG. 6 and then further fine tune the object template using visual tools, shown in FIG. 2A and FIG. 8A.

Figure 5:
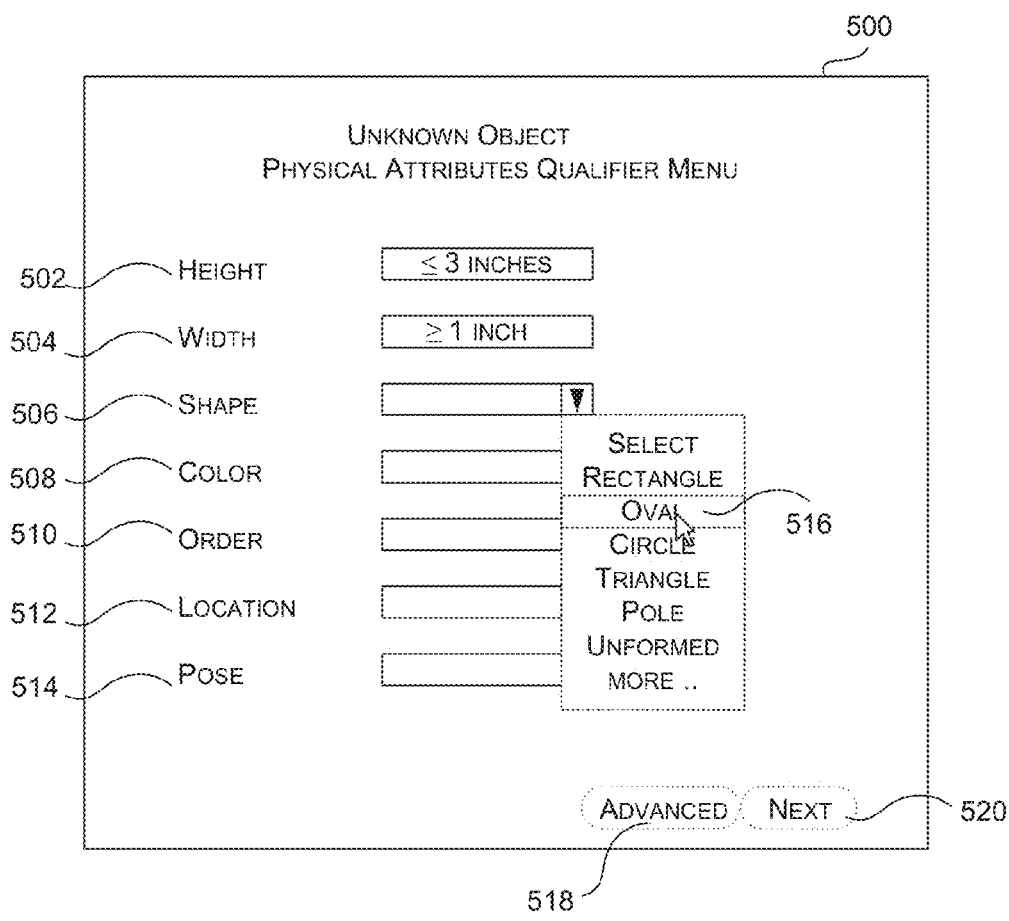
FIG. 5 illustrates an example user interface for selecting the physical attributes for the physical attributes qualifier, according to certain embodiments described in the disclosure.
Figure 6:
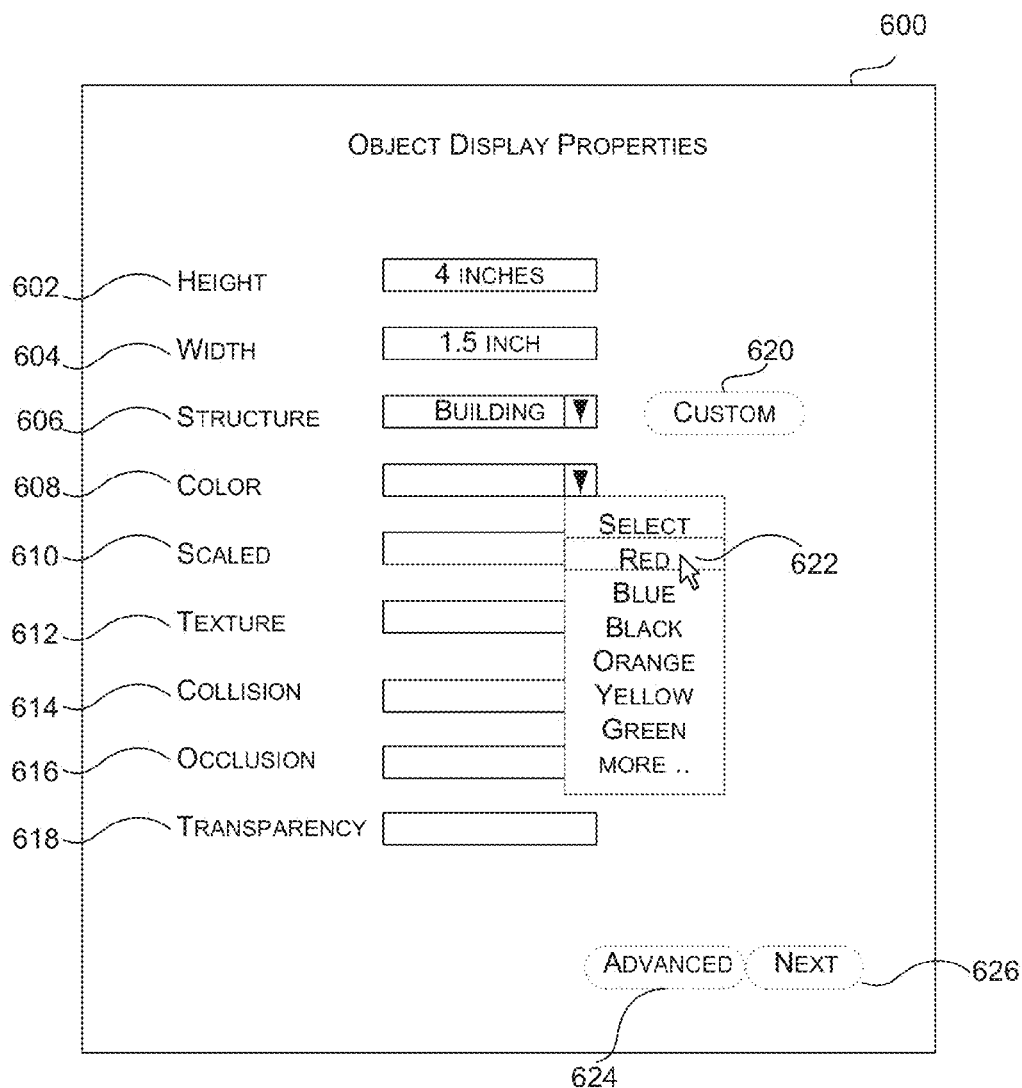
FIG. 6 shows an example user interface for selecting the display properties, according to certain embodiments described in the disclosure.

FIG. 5 illustrates an example user interface for selecting the physical attributes for the physical attributes qualifier 402 from FIG. 4. FIG. 5 shows an example menu user interface 500 provided by an editing tool for selecting the physical attributes for the physical attributes qualifier 402 in the editor mode. The user interface 500 shown in FIG. 5 is non-limiting and may be implemented in a variety of ways, such as a command line interface, or a drag and drop user-interface.

Using the menu user interface 500, the developer of the object template 400 can select a number of physical attribute qualifiers in the editing tool during the editor mode, for a potential unknown object that the application may encounter during runtime. The physical attributes selected by the developer using the editing tool are used in creating the object template 500. At run-time, the application detects the physical attributes of the unknown object and matches those physical attributes against the stored physical attributes in the physical attribute qualifier 402 of the object template 400 to determine if this particular object template 400 should be selected for determining the display properties for the unknown object.

In FIG. 5, example physical attributes qualifiers, such as height 502, width 504, shape 506, color 508, order 510, location 512 and pose 514 for a potential unknown object are shown. The developer may enter values or select from the drop down menus for the various physical attributes. For example, in FIG. 5, the developer has selected 3 inches as the upper bound for the height 502 of the unknown object, and 1 inch as the lower bound for the width 504 of the unknown object. In certain embodiments, the size of the unknown object may be expressed in terms of the display ratio with respect to the entire display image. In other embodiments, a fixed size or a range of sizes may be expressed using the height 502 and width 504 parameters.

For the shape 506, the developer may select a shape from the drop down menu, such as Oval 516. Similarly, the developer may select the color 508, the order 510, location 512 and pose 514. In some embodiments, the order 510 in which the unknown object may appear may also be of importance. For instance, the developer of the application may desire to turn the $3^{rd}$ unknown object that meets all the other qualifiers of the object template 400 into a star shape, whereas take 'no action' for the other objects that qualify. Similarly, the developer of the application may select a particular location (e.g., center, upper right corner, etc.) that the application would like to use the qualifier for and not for the entire display area.

At run-time, the application may be configured, either separately, or by selecting options in the object template (e.g., through the advanced button 518), to match a subset of conditions, all of the conditions, or match the conditions in a hierarchical manner (e.g., if condition 1 matches, match condition 2).

The fields shown in FIG. 5 are for illustrative purposes and are not meant to be limiting. Additional or fewer fields may be used for expressing physical attribute qualifiers without departing from the scope of the invention. Furthermore, in certain embodiments, advance parameters for physical attributes of the unknown object may be defined using the advanced 518 tab.

Once the developer has completed with configuring the object template 400 for physical attributes, the developer may select the next option 520, and complete the generation of the object template.

FIG. 6 shows an example user interface for selecting the display properties for rendering of the image or portion of the image in the augmented reality at which the unknown object was at. In run-time, once the object template 400 is selected, the object display properties may be used in rendering the image or portion of the image.

These object display properties 600 are selected by the developer at the time of creating the object template 400. For example, as shown in FIG. 6, the developer may select the height 602 and width 604 of the display object to be displayed. In certain embodiments, the size of the display object may be expressed in terms of the display ratio with respect to the entire display image. In other embodiments, a fixed size or a range of sizes may be expressed using the height 602 and width 604 parameters.

The developer may select a structure, such as a building, a shape, an object, etc. or define their own structure, using the custom button 620. In certain embodiments, the developer may select the color 608 from a drop down menu. In FIG. 6, the developer is shown to be selecting red 622 color from the drop down menu. Instead, or in addition, the developer may choose to scale the display object in relation to the size of the unknown object, using the scaled 610 parameter. In other words, the size of the display object may be a function of the size of the unknown object. In certain embodiments, the other visual characteristics of the display object, such as color and texture may also be a function of the unknown object itself. The developer may also define particular textures 612 or patterns for the display object.

Furthermore, the developer may also define transparency 618 for an object. Transparency of an object may refer to the amount of information visible for the portions of the image overlapped by the display object. In certain embodiments, transparency may be indicated by a percentage or ratio matrix, where it provides a relative scale for displaying the information associated with the display object with respect to the information associated with the information in a layer (or layers) below the display object.

In addition to static visual object display properties, such as described above, the object display properties 600 of the object template 400 may also describe dynamic visual object display properties, such as collision 614 and occlusion 616.

The collision 614 property of the object template 400 may define the collision characteristics of the display object. For example, if a moving virtual object, such as a car, collides against the display object, the display object may partially and either temporarily or permanently depress in some instances providing the visual effect of a squeezable (temporary depression) or a malleable (permanent depression) object surface of the display object. In certain embodiments, the collision 614 property may be such that the surface does not depress at all, for example, if the surface of the display object represents a cement wall of a building. In certain embodiments, the collision 614 property of the object may be such that a moving virtual object can completely and temporarily or permanently deform the object surface of the display object. For example, a car (i.e., virtual object) driving through a waterfall (display object) may temporarily completely deform the object surface of the waterfall. The properties of the collision 614 may also be a function of the force exerted on the surface of the display object. For example, the malleability and collision properties of the virtual object, the speed at which the virtual object approaches the display object and many other factors may be taken into consideration in determining the actual visual effect of a collision for a display object, before rendering the display object on the display. In some instances, the collision 614 properties may be generalized, using a collider scale (not shown). In other instances, more advance properties may be selected using an advanced 624 button.

Occlusion 616 may refer to the display objects ability to visually obstruct or block the viewing of another object as perceived by the viewer of the display. Generally, when the display object partially blocks the view of another object, the viewer of the display perceives the display object as closer. Therefore, at run-time, occlusion 616 property, when appropriately applied to a display object, allows the object to be perceived as appropriately ordered with respect to multiple objects. Although not shown, several other implementations and configuration options may be expressed and accommodated by allowing the developer to provide individual pluggable modules or more advanced configurations via the advanced 624 tab. For example, in some implementations, the display properties may include not only graphical properties, as described above, but also animation properties. For example, upon detection of certain conditions associated with the unknown object, the unknown object may morph into an animated feature, such as a monster or small explosion. Once the developer has completed with configuring the object template 400, the developer may select the finish option 624, and complete the generation of the object template.

Figure 7:
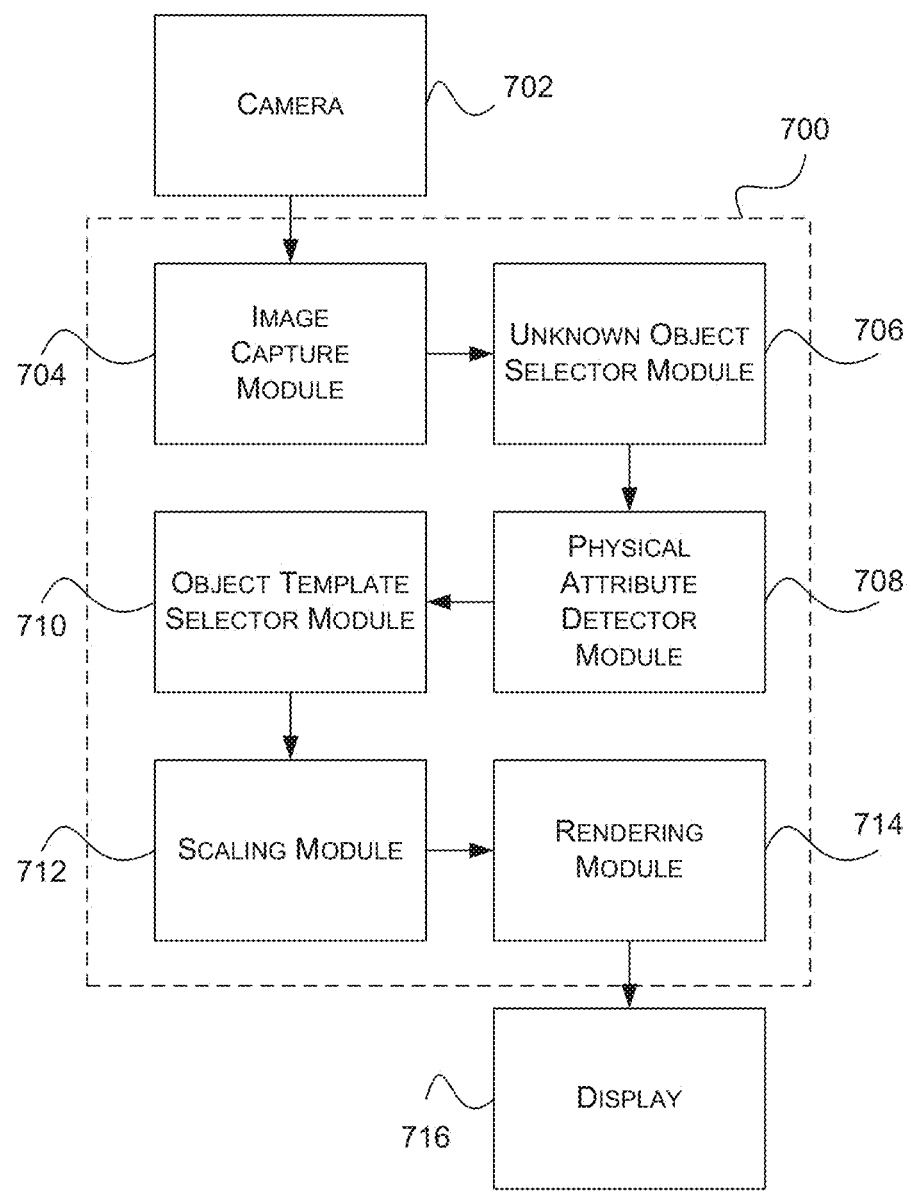
FIG. 7 illustrates a block diagram for example modules implemented in a mobile device for rendering the image on the display at run-time, according to certain embodiments described in the disclosure.

FIG. 7 illustrates a block diagram for example modules implemented in a mobile device 100 for rendering the image on the display at run-time, according to one embodiment of the invention. The mobile device 100 may be a computer device implemented using one or more components described in FIG. 11. Modules described in FIG. 7 may be implemented using software, firmware, hardware or any other combination thereof. In one embodiment, some of the modules described in FIG. 7 may be stored as software modules on a computer-readable medium 700 that may be any magnetic, electronic, optical, or other computer-readable storage medium. In one implementation, the computer-readable storage medium 700 may include an image capture module 704, unknown object selector module 706, physical attribute detector module 708, object template selector module 710, scaling module 712 and rendering module 714.

At run-time, the user of the mobile device may point the one or more cameras 702 at a physical scene and acquire/capture images/videos from the scene. In some instance, the lens of the camera, based on the selected camera parameters (zoom, shutter speed, exposure, etc.) acquires raw analog information that may be converted to digital information as part of the sensing technology or through analog to digital conversion logic.

The image capture module 704 may take the acquired/captured image/video information and stores the information in a memory buffer for further processing. In some instance, the image capture module 704 may convert the raw data to a data according to a standard, such as Exchangeable image file format (EXIF), bitmap, Joint Photographic Experts Group (JPEG) or Moving Picture Experts Group-4 (MPEG-4) before further processing the image data.

The unknown object selector module 706 may detect and select unknown objects from the image data received or accessed from the image capture module 704. In one implementation, before detecting the unknown object, the unknown object selector module 706 may detect the properties of the physical scene. For example, the unknown object selector module 706 may detect the surface as a planar surface and that several objects are placed on the planar surface. The unknown object selector module 706 may detect the planar surface and delineate several (known and unknown) objects in the physical scene by using known methods, such as surface detection, edge detection, feature detection and object detection. In certain embodiments, the unknown object selector module 706 may select objects that are unknown from the scene or cannot be identified from the physical scene using known methods. In certain other embodiments, all objects detected in the physical scene above the planar surface may be treated as unknown objects. The unknown object selector module 706 may use information from multiple images. Unknown objects may be tracked over time after they have been detected.

Once one or more unknown objects are detected, one or more of those unknown objects may be selected for further processing by the physical attribute detector module 708. The physical attribute detector module 708 may detect one or more physical attributes of the unknown object, such as size, shape, color, ordering, location and pose of the unknown object.

The object template selection module 710 may compare the physical attributes of the selected unknown object, detected by the physical attribute detector module 708, against the physical attribute qualifiers 402 of one or more object templates 400 and select an object template. The process of defining the physical attributes of the physical attributes qualifier 402 for an object template 400 in the editor mode are described in more detail in FIG. 4 and FIG. 5.

In certain embodiments, the scaling module 712 and the rendering module 714 may use the object display properties 406 from the selected object template 400 in rendering the display object at the location of the selected unknown object. For example, scaling module 712 may use the scaled 610 parameter selected by the developer at development time in the editing mode to determine if the display object should be scaled in size with respect to the size of the unknown object. The rendering module 714 may further render the display object using the selected object display properties 406 from the selected object template 400, such as height 602, width 604, structure 606, color 608, scale 610, texture 612, collision 614, occlusion 616 and transparency 618 for the display object. The rendering module 714 may render the display object at the location of the unknown object on the display 716 of the mobile device 100 at run-time, instead of the unknown object or by augmenting the display of the unknown object.

FIG. 8A illustrates two object templates as visually represented in the editor mode, according to one or more embodiments of the invention. The two building models (802 and 804) illustrated in FIG. 8A may each represent a distinct object template. The structure of the building models may provide structure 606 for the display objects as part of defining the visual appearance. The object templates are developed by a developer using the editing tool in the editor mode.

Figure 8B:
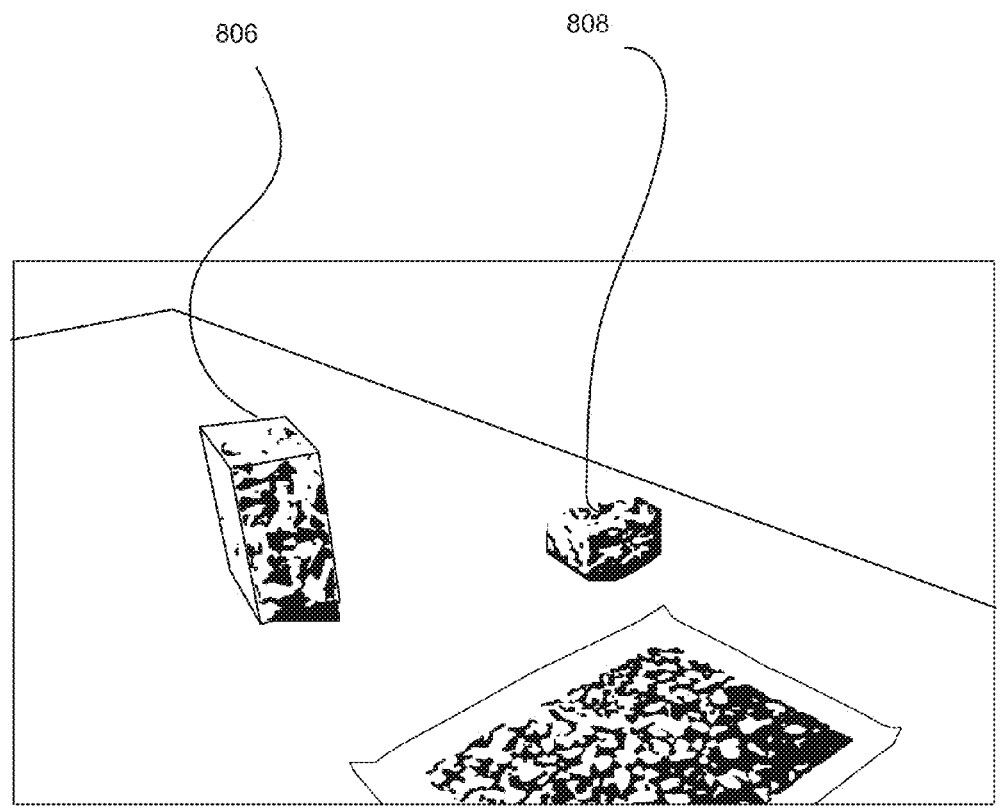
FIG. 8B illustrates the input image of the physical scene acquired by the camera coupled to the mobile device without modifications to it.
Figure 8C:
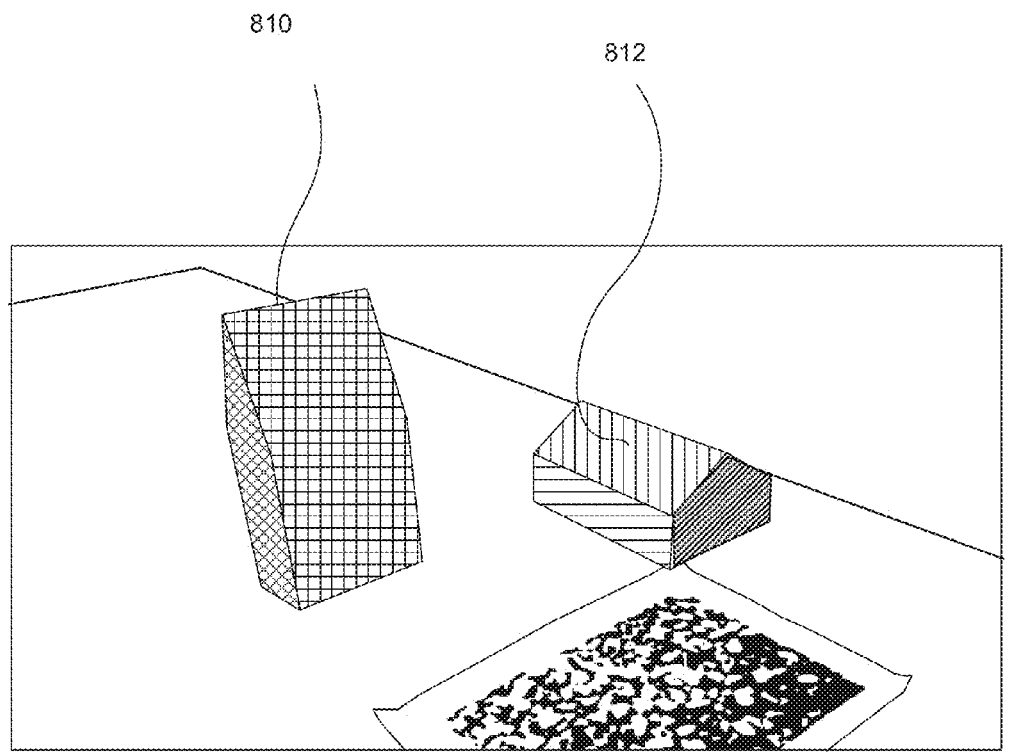
FIG. 8C illustrates an example of the augmented reality rendered image that may be displayed on the display screen of the mobile device.

FIG. 8B illustrates the input image of the physical scene acquired by the camera 702 coupled to the mobile device 100 without modifications to it. FIG. 8B represents an image acquired at a later time than the development of the object template shown in FIG. 8A. The image from FIG. 8B displays two unknown objects, a taller object 806 and the shorter object 808. Embodiments of the invention deduce attributes associated with the unknown objects (using the physical attribute detector module 708) such as height and size of the objects. FIG. 8C illustrates an example of the augmented reality rendered image that may be displayed on the display screen 716 of the mobile device 100. In FIG. 8C, the object templates are selected (using the object template selector module 710) for the unknown objects from the physical scene based on their height. For instance, object template 804 (FIG. 8A) may be associated with the real unknown object 806 (FIG. 8B) and then rendered as object 810 in FIG. 8C, based on the display properties of the respective object templates. Similarly, object template 802 (FIG. 8A) is associated with the real unknown object 808 (FIG. 8B) and then rendered as object 812 in FIG. 8C. Therefore, FIG. 8C represents an example of an augmented reality scene that may be displayed on the display screen 716 of the mobile device 100.

Figure 9:
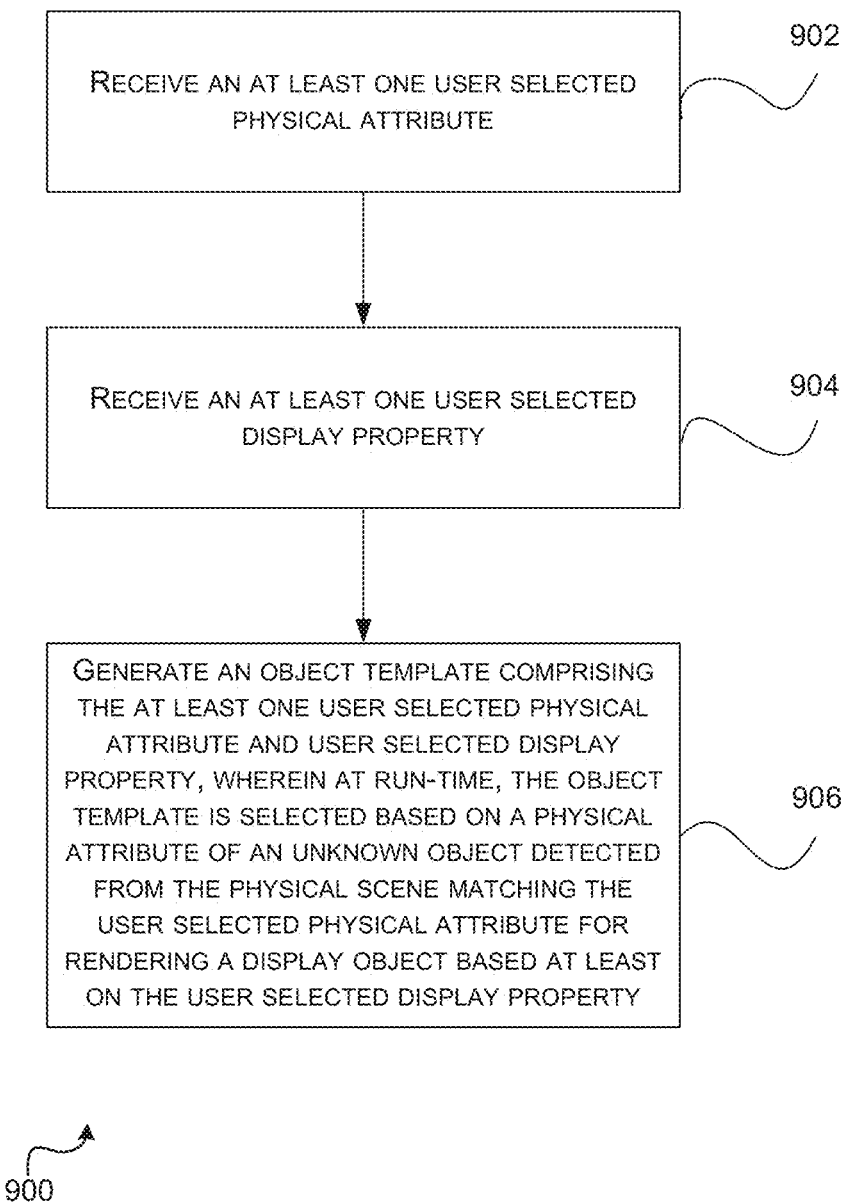
FIG. 9 illustrates a flow diagram for a method for generating an object template in editing mode, according to one or more embodiments described in the disclosure.

FIG. 9 illustrates a flow diagram for a method for generating an object template in editing mode, according to one or more embodiments of the invention. According to one or more aspects, any and/or all of the methods and/or method blocks described in the flow diagram 900, illustrated in FIG. 9, may be implemented by and/or in a computing device, components of which are described in greater detail in FIG. 11, for instance. In one embodiment, one or more of the method blocks described below with respect to FIG. 9 are implemented by a processor of the computing device, such as the processor 1110 or another processor. Additionally or alternatively, any and/or all of the methods and/or method blocks described herein may be implemented in computer-readable instructions, such as computer-readable instructions stored on a computer-readable medium such as the memory 1135, storage 1125 or another computer readable medium.

In certain embodiments, the computing device may facilitate an editing mode using an editing tool for developing one or more object templates for an application. At a later point in time, the application running on the same device or a different device, such as a mobile device, may use the one or more object templates in rendering of display objects instead of the unknown objects from the physical scene to the augmented reality display screen.

At block 902, components of the computing device may receive an at least one user-selected physical attribute. Physical attributes may include one or more of shape of the unknown object, size of the unknown object, location of the unknown object, pose of the unknown object, order of appearance of the unknown object with respect to other objects, mode of an application associated with the rendering of the display object, and attributes of other unknown objects. As shown in FIG. 5, in one example, the computing device may provide a user interface for receiving user-selected physical attributes.

At block 904, components of the computing device may receive an at least one user-selected display property. A display of the object template may include one or more of graphical and animation properties. The graphical properties of the object template may include, but are not restricted to, one or more of color, size, texture, shape, collision detection, occlusion, and transparency. As shown in FIG. 6, in one example, the computing device may provide a user interface for receiving user-selected physical attributes.

At block 906, components of the computing device, may generate an object template comprising the at least one user-selected physical attribute and user-selected display property, wherein at run-time, the object template is selected based on a physical attribute of an unknown object detected from the physical scene matching or satisfying the user-selected physical attribute for rendering a display object based at least on the user-selected display property.

Although FIG. 9 describes generating one object template several object templates may be generated in the editor mode for later use during run-time.

It should be appreciated that the specific blocks illustrated in FIG. 9 provide a particular method of switching between modes of operation, according to an embodiment of the present invention. Other sequences of blocks may also be performed accordingly in alternative embodiments. For example, alternative embodiments of the present invention may perform the blocks outlined above in a different order. To illustrate, a user may choose to change from the third mode of operation to the first mode of operation, the fourth mode to the second mode, or any combination therebetween. Moreover, the individual blocks illustrated in FIG. 9 may include multiple sub-blocks that may be performed in various sequences as appropriate to the individual block. Furthermore, additional blocks may be added or removed depending on the particular applications. One of ordinary skill in the art would recognize and appreciate many variations, modifications, and alternatives of the process.

Figure 10:
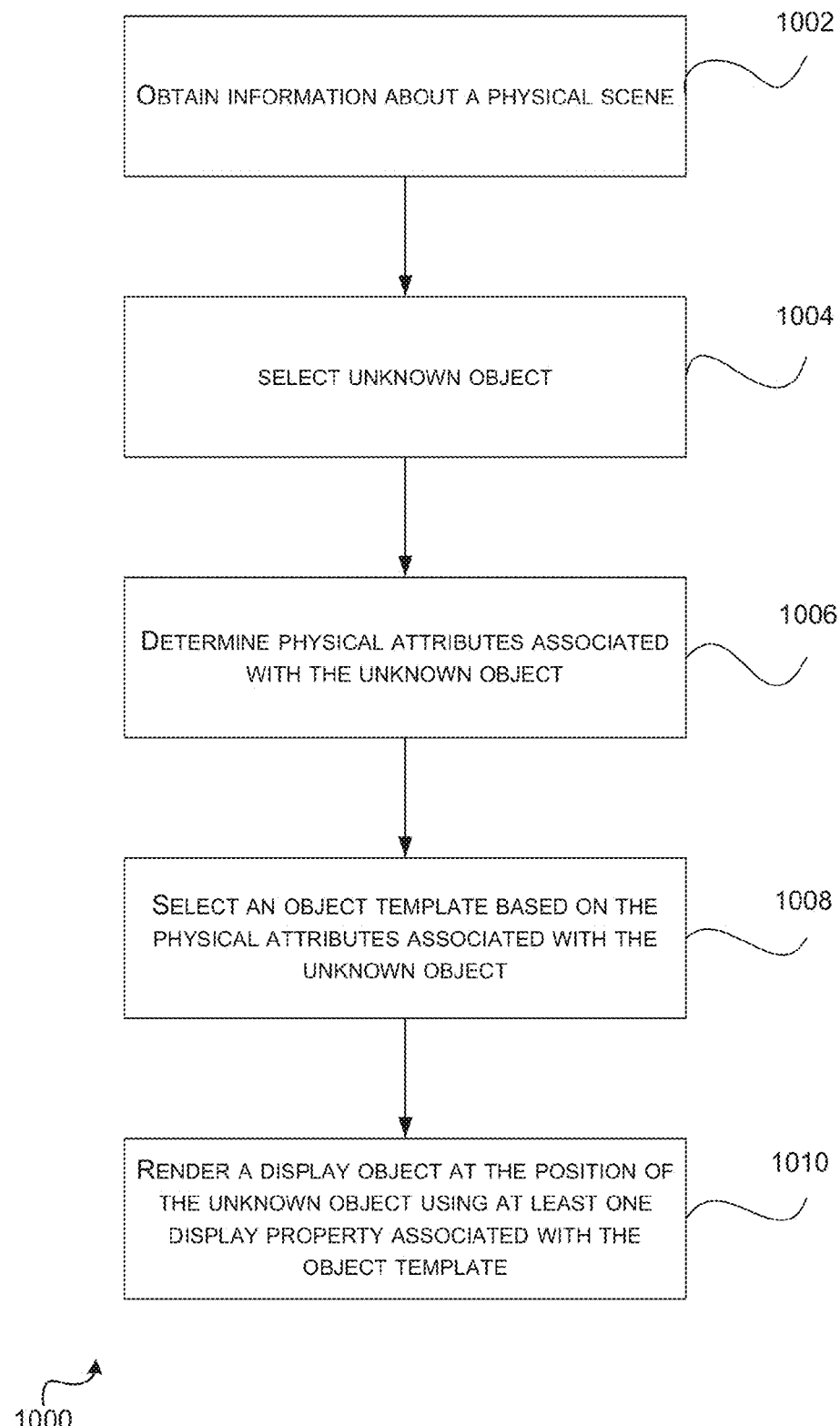
FIG. 10 illustrates a flow diagram for rendering the display image by performing a method, according to one or more embodiments described in the disclosure.

FIG. 10 illustrates a flow diagram for rendering the display image by performing a method, according to one or more embodiments of the invention. According to one or more aspects, any and/or all of the methods and/or method blocks described in the flow diagram 1000, illustrated in FIG. 10, may be implemented by and/or in an mobile device, components of which are described in greater detail in FIG. 11, for instance. In one embodiment, one or more of the method blocks described below with respect to FIG. 10 are implemented by a processor of the mobile device, such as the processor 1110 or another processor. Additionally or alternatively, any and/or all of the methods and/or method blocks described herein may be implemented in computer-readable instructions, such as computer-readable instructions stored on a computer-readable medium such as the memory 1135, storage 1125 or another computer readable medium.

At block 1002, components of the mobile device obtain information about the physical scene. For example, the mobile device 100 may detect that the scene has a planer surface, such as a table or flooring. At block 1004, components of the mobile device 100, such as the unknown object selector module 706, select an unknown object from the physical scene. In certain embodiments, components of the mobile device 100 also determine the pose of the unknown object.

At block 1006, components of the mobile device 100, such as the physical attribute detector module 708, determine physical attributes associated with the unknown object. In some embodiments, the attributes associated with the unknown object may include one or more of shape of the unknown object, size of the unknown object, location of the unknown object, pose of the unknown object, order of appearance of the unknown object with respect to other objects, mode of an application associated with the rendering of the display object, and attributes of other unknown objects.

At block 1008, components of the mobile device 100, such as the object template selector module 710, select an object template based on the physical attributes associated with the unknown object. In certain embodiments, components of the mobile device 100 may compare the physical attributes associated with the unknown object and the physical attribute qualifiers from the object template in selecting the object template.

At block 1010, components of the mobile device 100, such as the rendering module 714, may render a display object at the pose of the unknown object using at least one display property associated with the object template. In one aspect, rendering the display object may comprise rendering the display object on an image representing the physical scene to be displayed on a display screen of a mobile device.

In certain embodiments, the at least one display property of the object template may include one or more of graphical and animation properties. The graphical properties of the object template may include one or more of color, size, texture, shape, collision detection, occlusion, and/or transparency. In one implementation, the properties of the object template may be selected by a developer using an editing interface at the time of development of an application.

In one embodiment, multiple object templates may be defined. In another implementation, the unknown object may be one of a plurality of unknown objects and the object template may be associated with multiple unknown objects from the plurality of unknown objects.

It should be appreciated that the specific blocks illustrated in FIG. 10 provide a particular method of switching between modes of operation, according to an embodiment of the present invention. Other sequences of blocks may also be performed accordingly in alternative embodiments. For example, alternative embodiments of the present invention may perform the blocks outlined above in a different order. To illustrate, a user may choose to change from the third mode of operation to the first mode of operation, the fourth mode to the second mode, or any combination there between. Moreover, the individual blocks illustrated in FIG. 10 may include multiple sub-blocks that may be performed in various sequences as appropriate to the individual block. Furthermore, additional blocks may be added or removed depending on the particular applications. One of ordinary skill in the art would recognize and appreciate many variations, modifications, and alternatives of the process.

Figure 11:
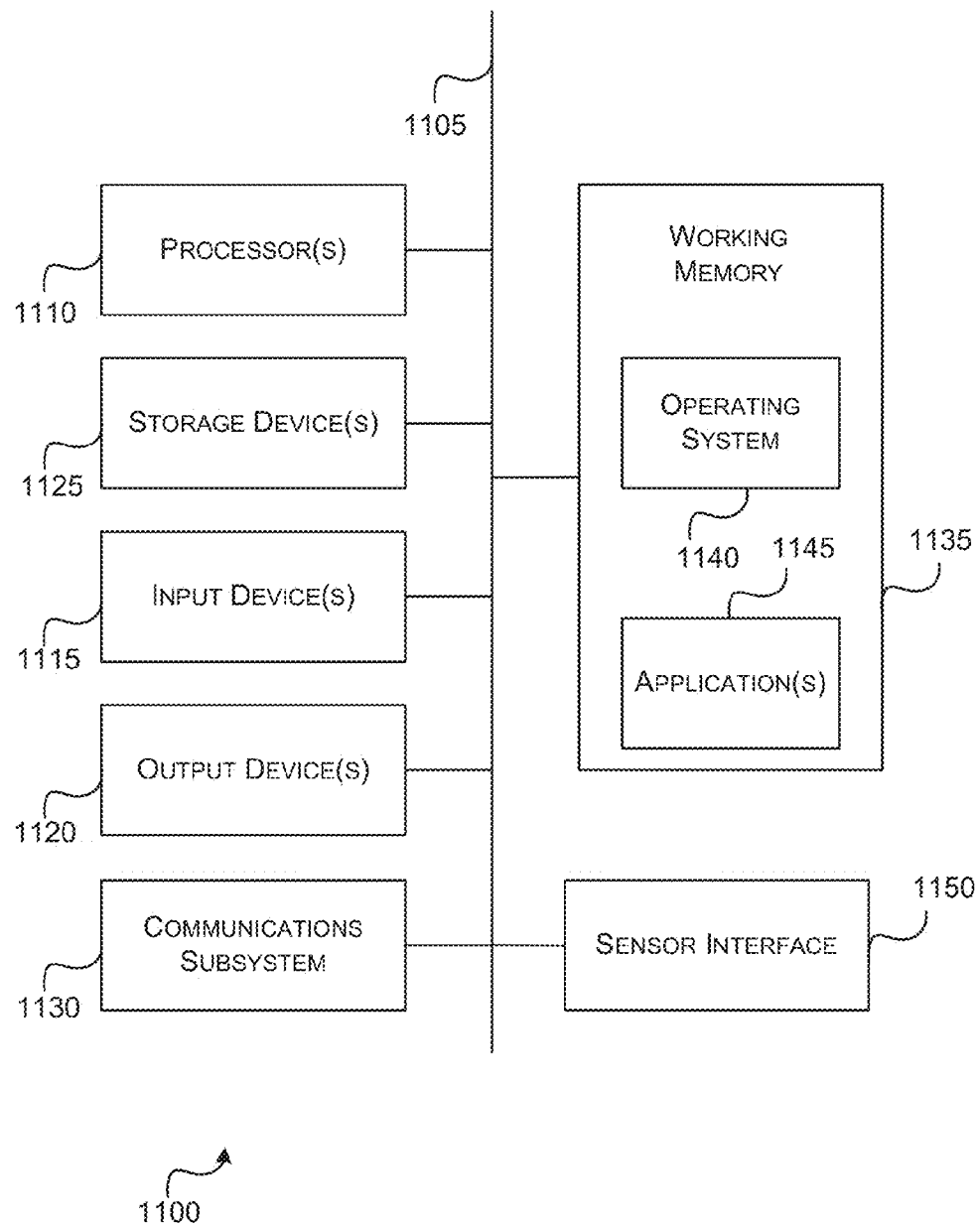
FIG. 11 illustrates an example of a computing system in which one or more embodiments may be implemented.

FIG. 11 illustrates an example computing device incorporating parts of the device employed in practicing embodiments of the invention. A computing device as illustrated in FIG. 11 may be incorporated as part of any computerized system, herein. For example, computing device 1100 may represent some of the components of a mobile device, or a computing device executing a 3D editing tool. Examples of a computing device 1100 include, but are not limited to, desktops, workstations, personal computers, supercomputers, video game consoles, tablets, smart phones, laptops, netbooks, or other portable devices. FIG. 11 provides a schematic illustration of one embodiment of a computing device 1100 that may perform the methods provided by various other embodiments, as described herein, and/or may function as the host computing device, a remote kiosk/terminal, a point-of-sale device, a mobile multifunction device, a set-top box and/or a computing device. FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computing device 1100 is shown comprising hardware elements that may be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which may include without limitation a camera, sensors 1150, a mouse, a keyboard and/or the like; and one or more output devices 1120, which may include without limitation a display unit, a printer and/or the like.

The computing device 1100 may further include (and/or be in communication with) one or more non-transitory storage devices 1125, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1100 might also include a communications subsystem 1130. The communications subsystem 1130 may include a transceiver for receiving and transmitting data or a wired and/or wireless medium. The communications subsystem 1130 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1130 may permit data to be exchanged with a network (such as the network described below, to name one example), other computing devices, and/or any other devices described herein. In many embodiments, the computing device 1100 will further comprise a non-transitory working memory 1135, which may include a RAM or ROM device, as described above.

The computing device 1100 may comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computing device, such as computing device 1100. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1100 and/or might take the form of source and/or installable code, which, upon compilation and/or installation on the computing device 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1100 such as network input/output devices may be employed.

Some embodiments may employ a computing device (such as the computing device 1100) to perform methods in accordance with the disclosure. For example, some or all of the procedures of the described methods may be performed by the computing device 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 1100, various computer-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire and fiber optics, including the wires that comprise the bus 1105, as well as the various components of the communications subsystem 1130 (and/or the media by which the communications subsystem 1130 provides communication with other devices). Hence, transmission media may also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1100. These signals, which might be in the form of electromagnetic signals, acoustic signals, optical signals and/or the like, are all examples of carrier waves on which instructions may be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional blocks not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of blocks may be undertaken before, during, or after the above elements are considered. Accordingly, the above description does not limit the scope of the disclosure.

What is claimed is:

1. A method for constructing a digital representation of a physical scene, comprising:
   selecting an unknown object from the physical scene;
   determining at least one physical attribute associated with the unknown object;
   comparing the at least one physical attribute associated with the unknown object against a physical attribute qualifier of an object template, wherein the object template represents an object different than the unknown object;
   selecting, by a processor, the object template based on the comparison of the at least one physical attribute associated with the unknown object against the physical attribute qualifier of the object template, the selecting including determining that the physical attribute qualifier of the object template matches the physical attribute associated with the unknown object; and
   rendering a display object in the digital representation of the physical scene at a position of the unknown object from the physical scene using at least one display property associated with the object template.

2. The method of claim 1, wherein the at least one physical attribute associated with the unknown object comprises one or more of shape of the unknown object, size of the unknown object, location of the unknown object, pose of the unknown object, order of appearance of the unknown object with respect to other objects, mode of an application associated with the rendering of the display object, and attributes of other unknown objects.

3. The method of claim 1, wherein the at least one display property associated with the object template comprises one or more of graphical and animation properties.

4. The method of claim 3, wherein the graphical properties of the object template comprises one or more of color, size, texture, shape, collision detection, occlusion, and transparency.

5. The method of claim 1, wherein properties of the object template are selected by a developer using an editing interface at a time of development of an application.

6. The method of claim 1, wherein the unknown object is one of a plurality of unknown objects and the object template is associated with multiple unknown objects from the plurality of unknown objects.

7. The method of claim 1, wherein the object template is one of a plurality of object templates.

8. The method of claim 1, wherein rendering the display object comprises rendering the display object on an image representing the physical scene to be displayed on a display screen of a mobile device.

9. A mobile device for constructing a digital representation of a physical scene, comprising:
   a camera configured to obtain image data indicative of the physical scene;
   a processor coupled to memory and configured to:
     select an unknown object from the physical scene;
     determine at least one physical attribute associated with the unknown object;
     compare the at least one physical attribute associated with the unknown object against a physical attribute qualifier of an object template, wherein the object template represents an object different than the unknown object;
     select the object template based on the comparison of the at least one physical attribute associated with the unknown object against the physical attribute qualifier of the object template, the selecting including determining that the physical attribute qualifier of the object template matches the physical attribute associated with the unknown object; and
     render a display object in the digital representation of the physical scene at a position of the unknown object from the physical scene using at least one display property associated with the object template.

10. The mobile device of claim 9, wherein the at least one physical attribute associated with the unknown object comprises one or more of shape of the unknown object, size of the unknown object, location of the unknown object, pose of the unknown object, order of appearance of the unknown object with respect to other objects, mode of an application associated with the rendering of the display object, and attributes of other unknown objects.

11. The mobile device of claim 9, wherein the at least one display property associated with the object template comprises one or more of graphical and animation properties.

12. The mobile device of claim 11, wherein the graphical properties of the object template comprises one or more of color, size, texture, shape, collision, occlusion, and transparency.

13. The mobile device of claim 9, wherein properties of the object template are selected by a developer, using an editing interface at a time of development of an application.

14. The mobile device of claim 9, wherein the unknown object is one of a plurality of unknown objects and the object template is associated with multiple unknown objects from the plurality of unknown objects.

15. The mobile device of claim 9, wherein the object template is one of a plurality of object templates.

16. The mobile device of claim 9, wherein rendering the display object comprises rendering the display object on an image representing the physical scene to be displayed on a display screen of the mobile device.

17. A non-transitory computer-readable storage medium, wherein the non-transitory computer-readable storage medium comprises instructions executable by a processor, the instructions comprising instructions to:
select an unknown object from a physical scene;
determine at least one physical attribute associated with the unknown object;
compare the at least one physical attribute associated with the unknown object against physical attribute qualifier of an object template, wherein the object template represents an object different than the unknown object;
select the object template based on the comparison of the at least one physical attribute associated with the unknown object against the physical attribute qualifier of the object template, the selecting including determining that the physical attribute qualifier of the object template matches the physical attribute associated with the unknown object; and
render a display object in a digital representation of the physical scene at a position of the unknown object from the physical scene using at least one display property associated with the object template.

18. The non-transitory computer-readable storage medium of claim 17, wherein the at least one physical attribute associated with the unknown object comprises one or more of shape of the unknown object, size of the unknown object, location of the unknown object, pose of the unknown object, order of appearance of the unknown object with respect to other objects, mode of an application associated with the rendering of the display object, and attributes of other unknown objects.

19. The non-transitory computer-readable storage medium of claim 17, wherein the at least one display property associated with the object template comprises one or more of graphical and animation properties.

20. The non-transitory computer-readable storage medium of claim 19, wherein the graphical properties of the object template comprise one or more of color, size, texture, shape, collision detection, occlusion, and transparency.

21. The non-transitory computer-readable storage medium of claim 17, wherein properties of the object template are selected by a developer using an editing interface at a time of development of an application.

22. The non-transitory computer-readable storage medium of claim 17, wherein the unknown object is one of a plurality of unknown objects and the object template is associated with multiple unknown objects from the plurality of unknown objects.

23. The non-transitory computer-readable storage medium of claim 17, wherein the object template is one of a plurality of object templates.

24. The non-transitory computer-readable storage medium of claim 17, wherein rendering the display object comprises rendering the display object on an image representing the physical scene to be displayed on a display screen of a mobile device.

25. An apparatus for constructing a digital representation of a physical scene, comprising:
means for selecting an unknown object from a physical scene;
means for determining at least one physical attribute associated with the unknown object;
means for comparing the at least one physical attribute associated with the unknown object against a physical attribute qualifier of an object template, wherein the object template represents an object different than the unknown object;
means for selecting the object template based on the comparison of the at least one physical attribute associated with the unknown object against the physical attribute qualifier of the object template, the selecting including determining that the physical attribute qualifier of the object template matches the physical attribute associated with the unknown object; and
means for rendering a display object in a digital representation of the physical scene at a position of the unknown object from the physical scene using at least one display property associated with the object template.

26. The apparatus of claim 25, wherein the at least one physical attribute associated with the unknown object comprises one or more of shape of the unknown object, size of the unknown object, location of the unknown object, pose of the unknown object, order of appearance of the unknown object with respect to other objects, mode of an application associated with the rendering of the display object, and attributes of other unknown objects.

27. The apparatus of claim 25, wherein the at least one display property associated with the object template comprises one or more of graphical and animation properties.

28. The apparatus of claim 27, wherein the graphical properties of the object template comprise one or more of color, size, texture, shape, collision detection, occlusion, and transparency.

29. The apparatus of claim 25, wherein properties of the object template are selected by a developer using an editing interface at the time of development of an application.

30. The apparatus of claim 25, wherein the unknown object is one of a plurality of unknown objects and the object template is associated with multiple unknown objects from the plurality of unknown objects.

* * * * *